United States Patent [19]

Strehler

[11] Patent Number: 5,176,431
[45] Date of Patent: Jan. 5, 1993

[54] VEHICLE DECELERATION PREDICTION BASED ON VEHICLE DIVE

[75] Inventor: Richard E. Strehler, Granger, Ind.

[73] Assignee: Allied-Signal Inc., Morristown, N.J.

[21] Appl. No.: 722,037

[22] Filed: Jun. 27, 1991

[51] Int. Cl.$^5$ .............................. B60T 8/66; G01P 7/00
[52] U.S. Cl. .................................. 303/103; 303/24.1; 303/22.8; 73/503
[58] Field of Search ...................... 364/426.01–426.03; 73/503; 180/41; 280/707; 303/22.1, 22.8, 24.1, 91, 95, 97, 100, 107, 111, 105

[56] References Cited

U.S. PATENT DOCUMENTS

| | | | |
|---|---|---|---|
| 3,213,376 | 10/1965 | Riordan et al. | 303/95 X |
| 3,664,711 | 5/1972 | Berry | 73/503 X |
| 3,677,094 | 7/1972 | Kupfmuller | 73/503 |
| 4,070,562 | 1/1978 | Kuno et al. | 364/426 |
| 4,534,599 | 8/1985 | Wright et al. | 303/22.8 |
| 4,686,626 | 8/1987 | Kuroki et al. | 364/426 |
| 4,718,013 | 1/1988 | Kubo et al. | 364/426 |
| 4,728,120 | 3/1988 | Buma et al. | 280/707 |
| 4,795,219 | 1/1989 | Brearley et al. | 303/100 X |
| 4,804,203 | 2/1989 | Glab et al. | 280/707 |
| 4,805,102 | 2/1989 | Ise et al. | 364/424.05 |
| 4,852,950 | 8/1989 | Murakami | 303/100 |
| 4,859,002 | 8/1989 | Yoshino | 303/103 |
| 4,876,650 | 10/1989 | Kubo | 364/426.02 |
| 4,920,493 | 4/1990 | Brearley et al. | 364/426.01 |
| 4,962,455 | 10/1990 | Ishikawa et al. | 303/97 X |
| 4,965,729 | 10/1990 | Häfner | 303/100 X |
| 4,974,163 | 11/1990 | Yasuno et al. | 303/97 X |
| 5,004,299 | 4/1991 | Brearley et al. | 303/111 X |
| 5,004,300 | 4/1991 | Brearley et al. | 303/111 X |

FOREIGN PATENT DOCUMENTS

| | | | |
|---|---|---|---|
| 322532 | 7/1989 | European Pat. Off. | 73/503 |
| 3345913 | 6/1985 | Fed. Rep. of Germany | 303/22.1 |
| 39946 | 4/1981 | Japan | 303/22.1 |
| 126353 | 6/1987 | Japan | 73/503 |

Primary Examiner—Robert J. Oberleitner
Assistant Examiner—Alfred Muratori
Attorney, Agent, or Firm—Larry J. Palguta; Ken C. Decker

[57] ABSTRACT

An improved scheme for predicting vehicle velocity independent of wheel speed for use in a vehicle antilock braking system (31) is disclosed and includes an arrangement for measuring variations in the separation between a reference point on the vehicle (11) and the surface (17) on which the vehicle (11) is supported. This measurement is appropriately scaled to obtain a signal indicative of vehicle deceleration and is integrated to obtain a signal indicative of vehicle velocity. The reference point may be a fixed location on the vehicle frame and the measuring arrangement may preferably determine variations in the spacing between the fixed point and the front axle. In the disclosed form, the measuring arrangement comprises a resistor the resistance of which varies as the spacing varies. This resistance may comprise a string potentiometer (39) fixed to the fixed point and having a lead wire (43) fastened to a lever arm (45) on the sway bar (47) of the vehicle front end suspension.

2 Claims, 2 Drawing Sheets

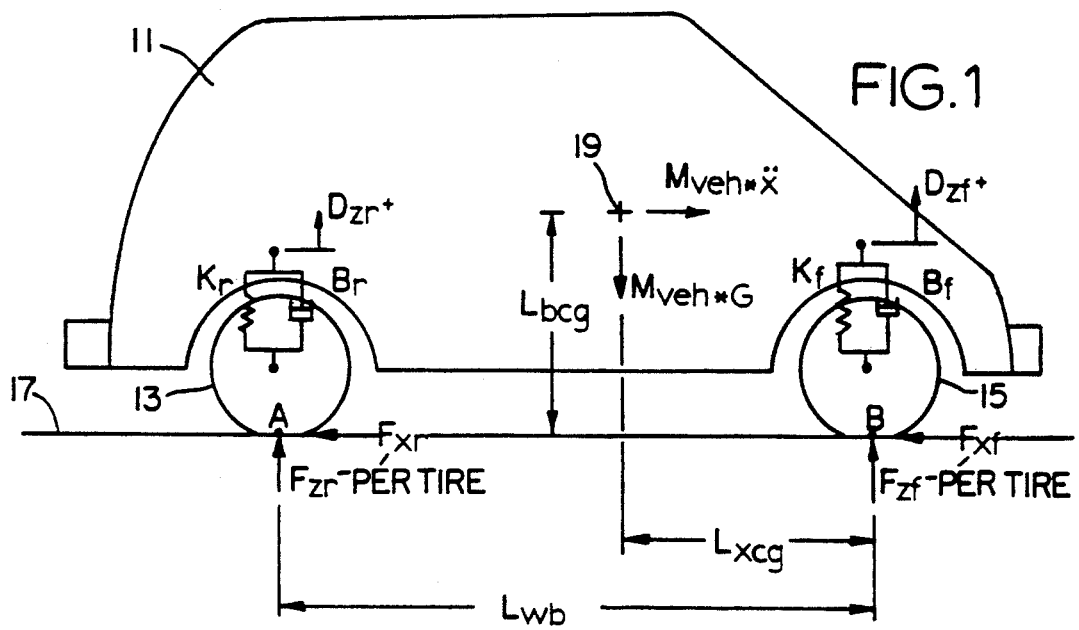
FIG. 1
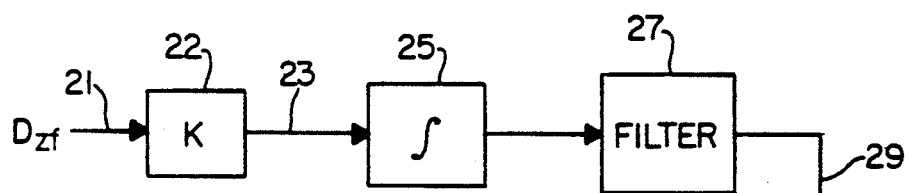
FIG. 2
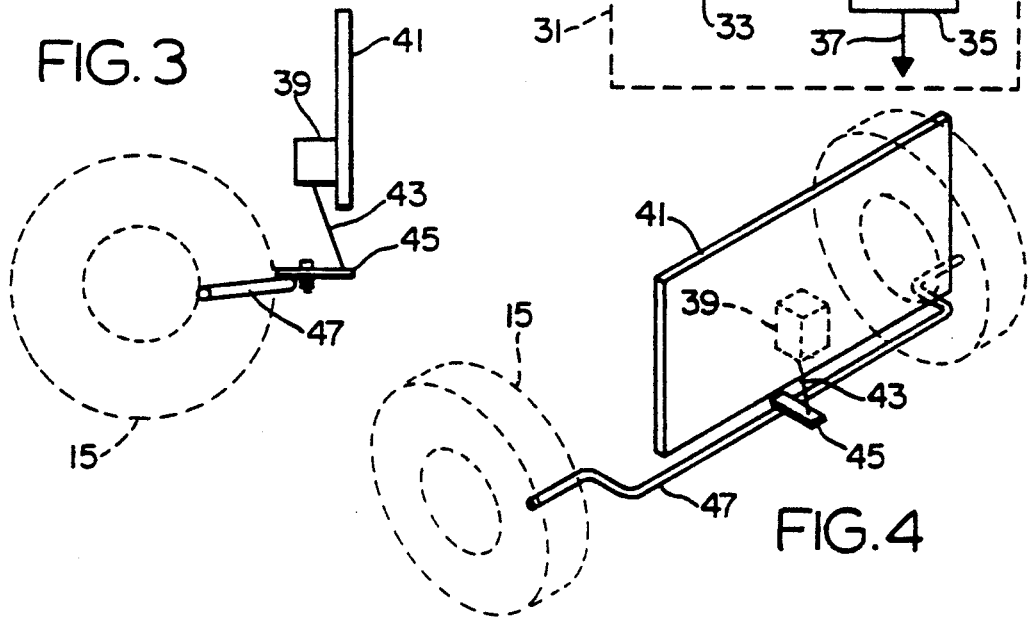
FIG. 3
FIG. 4

VEHICLE DECELERATION PREDICTION BASED ON VEHICLE DIVE

The present invention relates generally to schemes for measuring acceleration and more particularly to a vehicle deceleration estimate which is derived independent of wheel speed and which estimate is suitable for use in an antilock braking system.

BACKGROUND OF THE INVENTION

Many antilock braking systems derive an estimate of vehicle speed from the rotation of the vehicle wheels (called wheel speed) and another estimate of the vehicle speed by some means independent of wheel speed. A sufficient difference between these two estimates is indicative of wheel sliding on the road surface and calls for reduction in the braking pressure. There are many different schemes for deriving the vehicle estimate including free running fifth wheels, predictive schemes based on the wheel speed, and the provision of one of many types of accelerometers and then integrating the acceleration measurement to get an estimate of velocity. One common method is to provide one or more mercury switches for measuring acceleration (or its negative, deceleration). These mercury switch techniques seem to be adequate on conventional passenger cars yet inadequate on four wheel drive and similar vehicles. The schemes for predicting vehicle speed based on wheel speed can also lead to inaccurate results. For example, in a four wheel drive with locked differentials, if one wheel becomes locked, all will lock because of the rigid drive system, the system will have no reliable wheel speed information, and must predict (most likely inaccurately) velocity decrement until reliable information becomes available.

U.S. Pat. No. 3,677,094 utilizes a flexibly supported mass to measure vehicle acceleration and, by integration determined vehicle velocity. This patent teaches a technique for using the pitch of a vehicle relative to the inclination of the road on which the vehicle is moving to correct the measured vehicle velocity for road inclination.

Among the several objects of the present invention may be noted the provision of an improved accelerometer measurement for a moving vehicle; the provision of a new technique for estimating vehicle speed independent of wheel speed; the Provision of overall improvements in the operation of antilock braking systems for certain classes of vehicles; the Provision of a method of predicting vehicle velocity by measuring the compression of the front end suspension of the vehicle; and the provision of a simplistic device which measures the dip or forward rotation experienced by a vehicle when being braked and for translating that dip into an indication of the vehicle's velocity.

In vehicles with adaptive suspension systems as well as antilock braking systems, sensor information and/or control signals may be shared by both systems. Since there should be no dip with an adaptive suspension system, the information needed for the present velocity prediction might come from force, torsion or similar measurements.

Accordingly, a further object of the present invention is to provide a vehicle velocity measurement scheme which is compatible with adaptive suspension systems. These as well as other objects and advantageous features of the present invention will be in part apparent and in part pointed out hereinafter.

SUMMARY OF THE INVENTION

In general, the present invention utilizes the all-too-familiar lurch forward experienced by driver and passengers alike when the brakes of a moving vehicle are suddenly applied. Since the center of gravity of most any land vehicle is above the surface on which it rides, application of the brakes results in a dip of the front end of the vehicle toward the road surface. The more severe the deceleration, the more dip is experienced. According to the present invention, a method of and apparatus for predicting instantaneous velocity of a moving vehicle comprises providing a measure of the tendency of the vehicle front end to lower as the brakes are applied, and determining the integral of the provided measure to estimate instantaneous vehicle velocity. Preferably, the provided measure is substantially directly proportional to vehicle deceleration and the method includes the additional step of multiplying the measure by an appropriate constant of proportionality prior to the step of determining the integral. Of course, such a constant may pass through an integral sign so the point in the process at which the scaling takes place is arbitrary. The measure is provided by measuring the distance the front portion of the vehicle is lowered when the vehicle brakes are applied. Additionally, the integral of the provided measure may be filtered to remove unwanted perturbations prior to utilizing the integral as an estimate of instantaneous velocity.

BRIEF DESCRIPTION OF THE DRAWINGS

FIG. 1 is a schematic side elevation view of a vehicle;

FIG. 2 is a functional block diagram of an antilock braking system incorporating the present invention in one form;

FIG. 3 is a side elevation view of structure for measuring vehicle dip experienced while braking;

FIG. 4 is a perspective view of the dip measuring structure of FIG. 3;

Corresponding reference characters indicate corresponding parts throughout the several views of the drawings.

DETAILED DESCRIPTION OF THE INVENTION

Figure 5:
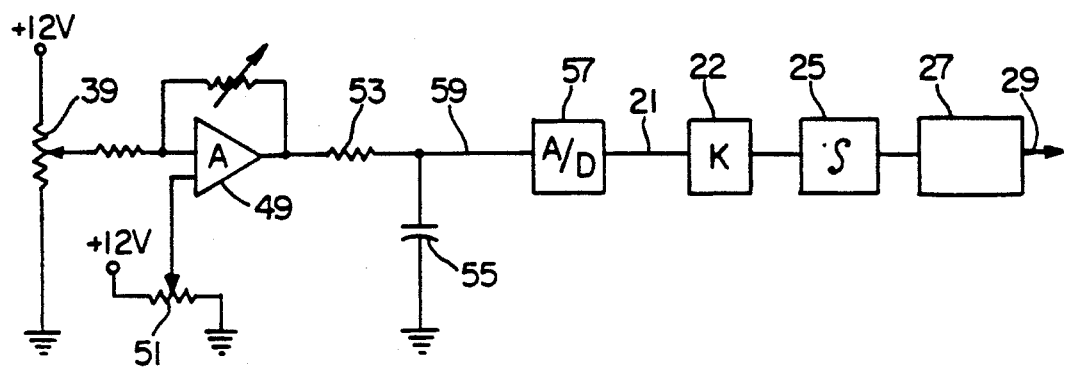
FIG. 5 is a schematic diagram of an illustrative circuit for practicing the present invention.

The exemplifications set out herein illustrate a preferred embodiment of the invention in one form thereof and such exemplifications are not to be construed as limiting the scope of the disclosure or the scope of the invention in any manner.

Referring now to FIG. 1, a somewhat idealized vehicle 11 has points of contact between its rear wheels 13 and front wheels 15 and the road surface 17 at A and B respectively. The vehicle center of gravity 19 is well above these contact points. The vertical direction is considered positive z and the forward (rightward) direction positive x. In addition to x and z, subscripts f and r indicate front and rear respectively, while "veh" is used as a subscript for the vehicle and "cg" as a subscript identifying its center of gravity. The vehicle suspension is represented by spring constants K and damping coefficients B. The vertical forces may be equated at the front and rear suspensions, and the moments summed about the points A and B. The vertical displacement of the front end of the vehicle from its steady state value (the dive) is indicated by $D_{zf}$ and is related to acceleration $x''$ after a number of simplifying assumptions by the equation:

$$D_{zf} = \frac{M_{veh} * L_{zcg0} * x''}{4 * K_f * L_{wb}}$$

where $M_{veh}$ is the mass of the vehicle, $L_{zcg0}$ is the vertical distance between the steady state center of gravity and the road surface 17, $K_f$ is the spring constant for the front suspension, and $L_{wb}$ is the wheel base length between points A and B.

The only variables in the above equation are $x''$ and $D_{zf}$, hence these two are related by a constant for the particular vehicle and measuring one, after appropriate scaling, yields the other.

The vertical displacement is the input on line 21 of FIGS. 2 while the constant K multiplier 22 converts this input to $x''$ as an output on line 23. The acceleration is then integrated by integrator 25 and filtering of the integral at digital filter 27 removes unwanted perturbations prior to utilizing the integral as an estimate of instantaneous velocity on line 29 as one input to an otherwise conventional antilock brake system 31. Such a conventional system may include a wheel speed sensor 33, comparator 35 and a corrective output 37.

The amount of vertical displacement of the front end of the vehicle may be determined in a multitude of ways. FIGS. 3 and 4 show a string potentiometer 39 fixed to a radiator support 41 and having its variable length lead wire 43 fastened to an arm or tongue 45 on the front end sway bar 47 of the vehicle. The potentiometer 39 is fixed to the vehicle, but the sway bar moves upward relative to the vehicle, returning cable to the potentiometer and changing its resistance as the front end of the vehicle dips.

This potentiometer 39 converts the change in resistance to a change in one input voltage to amplifier 49 as shown in FIG. 5. The voltage from the variable contact of potentiometer 39 at zero vehicle dip, i.e., steady state, is balanced at the other amplifier input by an appropriate setting of potentiometer 51. The amplifier 49 and its associated circuitry functions as a signal conditioning amplifier and a zero control. The output from amplifier 49 is supplied to a low-pass filter consisting of resistor 53 and capacitor 55. The low-pass filter provides the input on line 59 to analog to digital converter 57 the output of which on line 21 is further processed as discussed in conjunction with FIG. 2.

Figure 6:
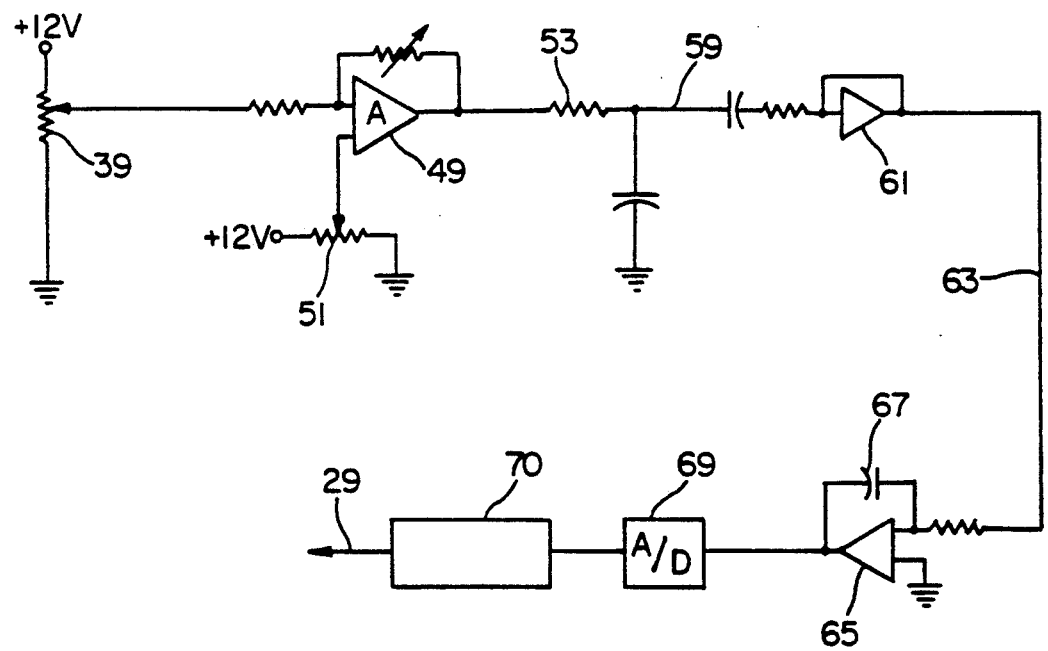
FIG. 6 is a schematic diagram of another circuit suitable for the practice of the present invention.

Analog to digital conversion may occur later in the process in a more hardware intensive circuit as illustrated in FIG. 6. Signal processing up to and including the output from the low-pass filter on line 59 may be the same as discussed in conjunction with FIG. 5. The output on line 59 may be supplied to high-pass filter and buffer circuitry including the series resistor-capacitor circuit and amplifier 61. The selected pass-band on line 63 is then subjected to an analog integration in amplifier 65 having capacitive feedback 67 and the integrated analog signal converted to a digital signal in the analog to digital converter 69 and then filtered through digital filter 70. As in FIG. 5, the output on line 29 is supplied to a conventional antilock brake system 31 for further processing.

I claim:

1. In a vehicle antilock braking system, the improvement for predicting vehicle velocity independent of wheel speed, comprising means for measuring variations in a separation between a reference point on a vehicle frame of a vehicle and a surface on which the vehicle is supported, the means for measuring comprising a resistor the resistance of which varies as the separation varies, the resistor being a string potentiometer fixed to the reference point and having a lead wire fastened to a lever arm on a sway bar of a front end suspension of the vehicle, means for scaling variations in the separation to obtain a signal indicative of vehicle deceleration, and means for integrating the deceleration indicative signal to obtain a signal indicative of vehicle velocity.

2. The improvement of claim 1, wherein the separation is $D_{zf}$ and is related to horizontal acceleration $x''$ by the equation:

$$D_{zf} = \frac{M_{veh} * L_{zcg0} * x''}{4 * K_f * L_{wb}}$$

where $M_{veh}$ is the mass of the vehicle, $L_{zcg0}$ is a vertical distance between the vehicle steady state center of gravity and the surface on which the vehicle is supported, $K_f$ is a spring constant for the front end suspension, and $L_{wb}$ is a wheel base length of the vehicle.

* * * * *